(12) United States Patent
Rzeppa

(10) Patent No.: US 6,659,229 B2
(45) Date of Patent: Dec. 9, 2003

(54) PNEUMATIC IN-LINE LUBRICATOR

(76) Inventor: Michael V. Rzeppa, 7144 Marsh Rd., Marine City, MI (US) 48039

( * ) Notice: Subject to any disclaimer, the term of this patent is extended or adjusted under 35 U.S.C. 154(b) by 189 days.

(21) Appl. No.: 09/851,908

(22) Filed: May 9, 2001

(65) Prior Publication Data

US 2002/0166730 A1 Nov. 14, 2002

(51) Int. Cl.[7] .............................................. F16N 13/08
(52) U.S. Cl. ........................ 184/55.2; 184/28; 92/159; 92/160
(58) Field of Search .......................... 92/158, 159, 160; 184/7.4, 28, 42, 55.1, 55.2

(56) References Cited

U.S. PATENT DOCUMENTS

| | | | |
|---|---|---|---|
| RE19,041 E | | 1/1934 | Martin, Jr. |
| 2,057,343 A | | 10/1936 | Pierce |
| 3,809,184 A | * | 5/1974 | Smith et al. .................. 184/7.4 |
| 3,841,438 A | * | 10/1974 | Tine et al. ................... 184/55.2 |
| 3,955,647 A | * | 5/1976 | Tine et al. ................... 184/39.1 |
| 4,079,266 A | * | 3/1978 | Vipond ........................ 307/116 |
| 4,318,422 A | * | 3/1982 | Nakanishi et al. .......... 137/246 |
| 4,450,938 A | * | 5/1984 | Davenport et al. ......... 184/55.2 |
| 4,598,796 A | * | 7/1986 | Barrows ...................... 184/42 |
| 4,648,998 A | * | 3/1987 | Araki ........................... 92/158 |
| 6,071,097 A | * | 6/2000 | Gruett et al. ............... 184/55.2 |
| 6,099,270 A | * | 8/2000 | Wech ........................... 184/55.2 |

* cited by examiner

*Primary Examiner*—Chong H. Kim
(74) *Attorney, Agent, or Firm*—Harness, Dickey & Pierce, P.L.C.

(57) ABSTRACT

An in-line lubricator for a pneumatic tool system includes a body defining a fluid reservoir and a working passageway and an actuator positionable within the body. The actuator includes an elongated body having a transfer cavity formed therein which is in fluid communication with the fluid reservoir when the actuator is in a first position and which is in fluid communication with the working passageway when the actuator is in the second position. Movement of the actuator from the first position to the second position transports a predetermined amount of fluid from the fluid reservoir into the working passageway.

22 Claims, 3 Drawing Sheets

PNEUMATIC IN-LINE LUBRICATOR

FIELD OF THE INVENTION

The present invention relates to systems for lubricating a pneumatically-driven power tool and specifically to an in-line lubricator configured to introduce a predetermined amount of lubricant into the compressed airflow which drives the motor.

BACKGROUND OF THE INVENTION

Pneumatic tools such as screwdrivers, nailers and the like, generally comprise a body housing a pneumatic motor connected by a kinematic coupling to a drive member. The body includes a handle connected to a source of fluid under pressure and a trigger for controlling the entry of fluid, such as compressed air, to drive the motor.

In many cases, it is desirable to introduce lubricant into the compressed air flow for lubricating the motor or other parts of the tool. A number of conventional arrangements provide lubrication consistently into the flow of air when the device is in operation. Often it is not desirable to provide a constant flow of lubrication into the components of the tool. Thus, an in-line lubricator which selectively introduces a metered amount of lubrication into the compressed airflow is needed.

SUMMARY OF THE INVENTION

It is a general object of the present invention to provide a method and apparatus which provide an in-line lubricator for transferring a predetermined amount of fluid from a first location to a second location.

In one form, the present invention provides an apparatus including a body defining a working channel and a fluid reservoir. The fluid reservoir contains lubricating fluid therewithin. The apparatus further includes an actuator having an elongated body including a transfer cavity. The transfer cavity is in fluid communication with the fluid reservoir in a first position. The actuator is movable to a second position whereby the transfer cavity dispenses a predetermined amount of lubricating fluid into the working channel.

In another form, the present invention provides an arrangement for delivering a predetermined amount of lubricating fluid from a first location to a second location. The apparatus includes a body defining a working channel and fluid reservoir, the fluid reservoir containing lubricating fluid therewithin. The arrangement further includes a piston actuable between a first position and a second position. The piston includes a collection chamber in fluid communication with and operable to accumulate fluid from the fluid reservoir in the first position and dispense fluid therefrom into the working channel in the second position.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
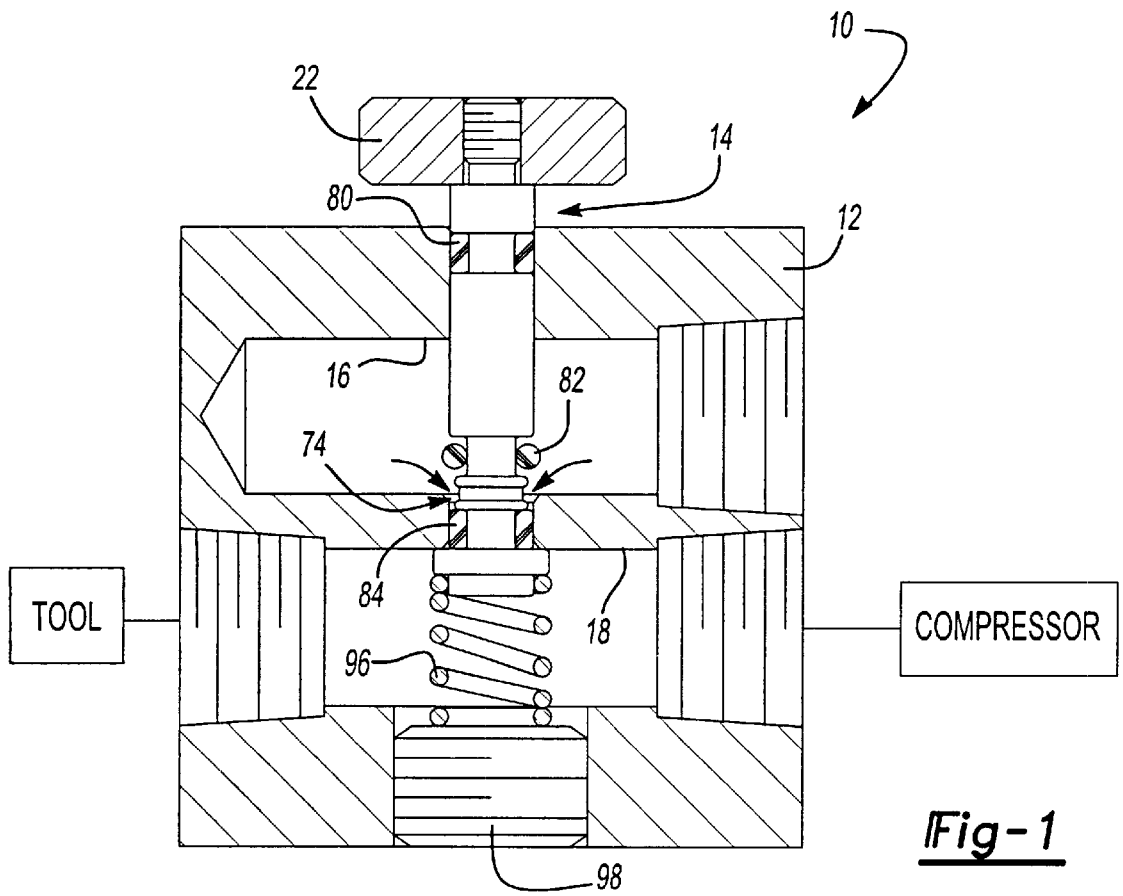
FIG. 1 is a cutaway view of the in-line lubricator shown in the first position.

With initial reference to FIG. 1, the in-line lubricator according to the teachings of the present invention is illustrated and identified at reference numeral 10. The in-line lubricator 10 generally includes a body 12 and actuator or piston 14. As particularly shown, body 12 defines a first cavity or fluid reservoir 16 and a second cavity or working passageway 18. As presently preferred, the volume of fluid reservoir 16 is approximately one-eighth (⅛) of an ounce.

Figure 2:
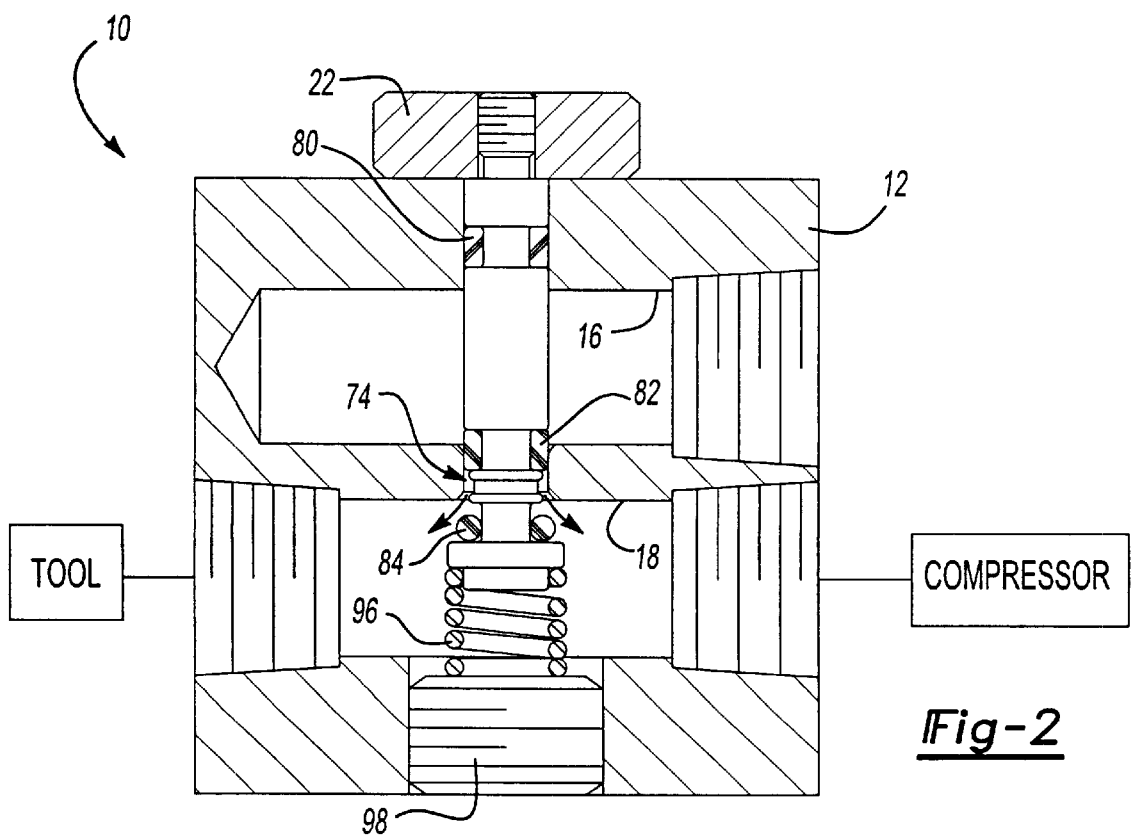
FIG. 2 is a cutaway view of the in-line lubricator shown in the second position.

With continued reference to FIGS. 1–3, the body 12 will be described in more detail. In the exemplary embodiment the fluid reservoir 16 contains a lubricating fluid such as oil and is oriented in a parallel relationship to the working passageway 18 which is configured to allow air flow therethrough. Working passageway 18 terminates at each end with threaded apertures adapted to receive a coupling for connecting the in-line lubricator between a compressor or other source of compressed air and a pneumatic tool. While in-line lubricator 10 is illustrated as a separate component from tool and compressor, one skilled in the art would recognize that the present invention could be configured as an integrated part of the tool and/or the compressor.

Figure 3:
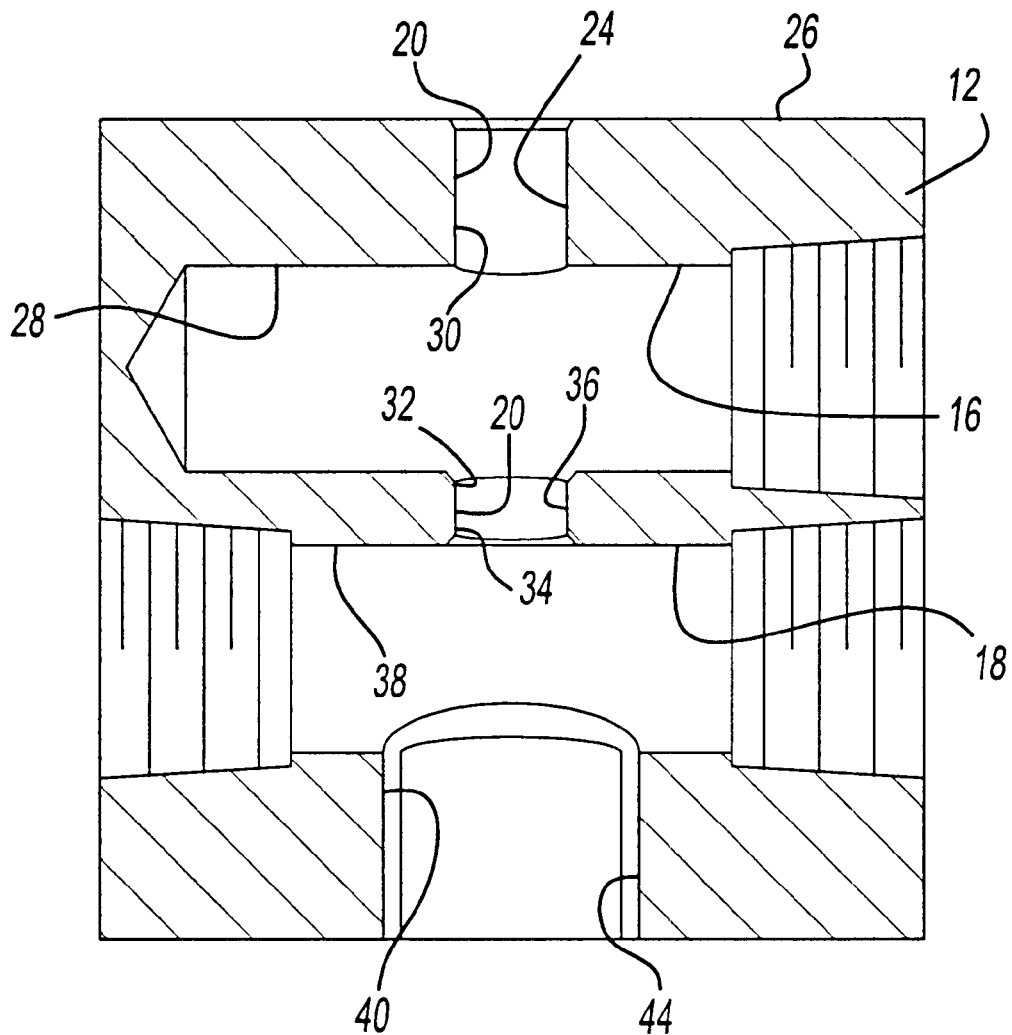
FIG. 3 is a cutaway view of the in-line lubricator with the actuator removed.
Figure 4:
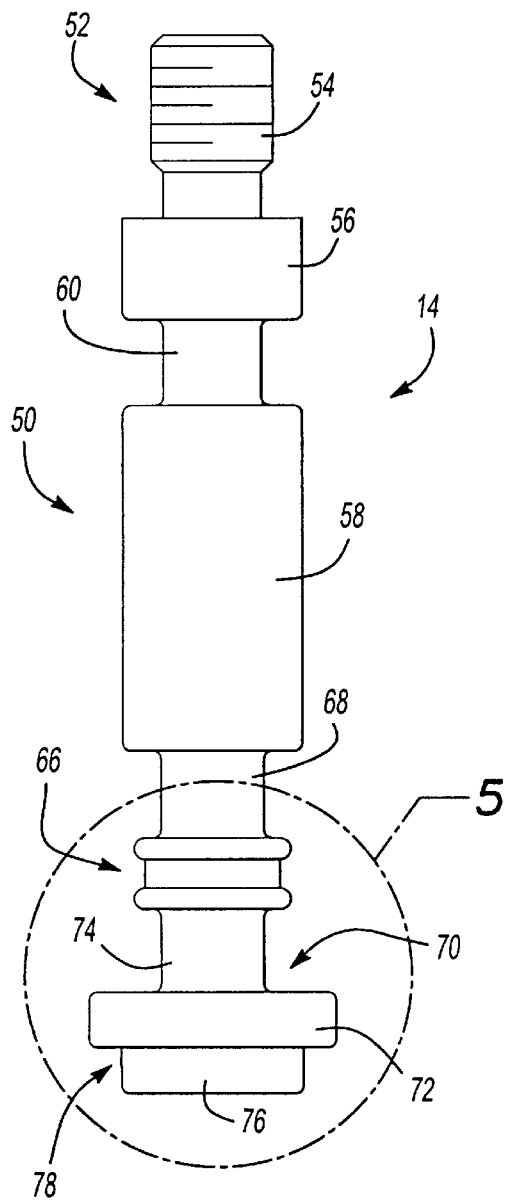
FIG. 4 is a side view of the actuator.

With particular reference to FIG. 3, actuator 14 has been removed for illustrative purposes. A first bore 20 extends from an outer surface 26 of body 12 through an inner circumferential wall 28 of fluid reservoir 16 defining first and second diametrically opposed ports 30, 32. First bore 20 further extends to an inner circumferential wall 38 of working passageway 18 defining a third port 34 thereat. A second bore 40 extends from outer surface 26 of body 12 to inner circumferential wall 38 of working channel 18 defining passage 44. Second bore 40 is preferably aligned axially with first bore 20.

Actuator 14 will be further described referencing all figures. The actuator 14 is configured to axially slide through first bore 20 between a first position (FIG. 1) and a second position (FIG. 2). Actuator 14 is generally defined by elongated body 50. First end 52 is defined by head 54 configured to receive handle 22 therearound. Handle 22 may be press fit onto head 54 or otherwise suitably secured to head 54 by a threaded connection or other like fastening means. First and second collars 56, 58 are axially separated by first neck 60. A transfer cavity or collection chamber 66 is axially displaced from second collar 58 by second neck 68. A second end 70 of elongated body 50 is defined by disk 72 which is axially displaced from collection chamber 66 by third neck 74. A ridge 76 radially extends from disk 72 defining a step thereat to form a spring seat 78 as further described hereafter.

First neck 60 includes a first O-ring 80 journalled therearound for engagement with circumferential wall 24 of first bore 20. First O-ring 80 provides an interference fit between actuator 14 and circumferential wall 24 of bore 20 creating a seal therebetween. Second O-ring 82 provides an interference fit between actuator 14 and bore 20 when the actuator 14 is in the second position creating a seal therebetween to inhibit fluid flow from the fluid reservoir 16 to the working passageway 18. Second O-ring 82 is disengaged from bore 20 in the first position. Third O-ring 84 provides an interference fit between actuator 14 and circumferential wall 36 of bore 20 when the actuator is in the first position creating a seal therebetween to inhibit fluid flow from the fluid reservoir 16 to the working passageway 18. Third O-ring 84 is disengaged from bore 20 in the second position.

Figure 5:
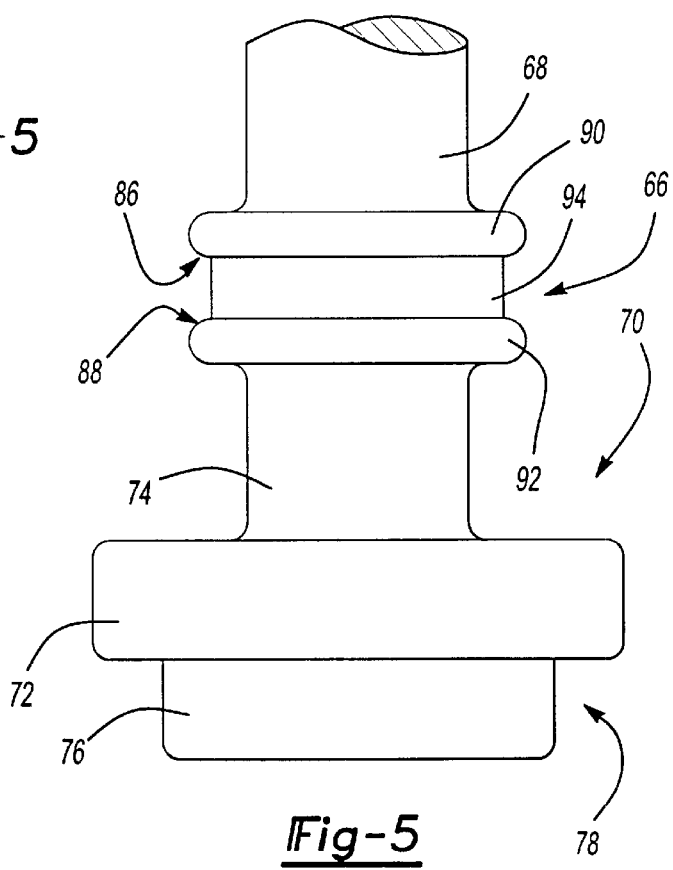
FIG. 5 is a detailed view of the second end of the actuator.

Turning now to FIG. 5, collection chamber 66 is defined by the area between opposing radiused surfaces 86, 88 of ribs 90, 92. Collection chamber 66 further includes an inner boundary defined by circumferential wall 94 and an outer boundary defined as circumferential wall 36. Thus, the volume of collection chamber 66 is the annulus defined by radiused surfaces 86, 88 and circumferential walls 36, 94. As presently preferred the volume of collection chamber 66 is approximately 0.001 in$^3$ or approximately the equivalent of one (1) drop of oil. However, One skilled in the art will recognize that the volume of collection chamber may be adjusted in accordance with the given application.

Referencing FIG. 1, a spring 96 biases disk 72 into engagement with inner circumferential wall 38 of working channel 18 around third port 34. Spring 96 is supported at one end by spring set 78 of disk 72 and at the opposite end by a threaded plug 98 disposed in passage 44 and axially biases actuator 14 in the first or closed position. Plug 98 is removable from passage 44 to provide access to working chamber 18 for assembly of in-line lubricator 10 and for drainage purposes or other maintenance needs.

The operation of in-line lubricator 10 will now be described. Actuator 14 is linearly actuable from a first position (FIG. 1) to a second position (FIG. 2). To displace actuator 14 from a first position to a second position, the handle 22 is moved from a location laterally displaced from the outer wall 26 of body 12, i.e. the first position to a location laterally engaged with outer wall 26, i.e. the second position. While handle 22 is shown as a cylindrical disk, one skilled in the art will recognize that other geometrical configurations may be used or alternately a cantilever arm extending at various orientations relative to body 12 may be used.

In the first position, fluid within the fluid reservoir 16 occupies the area defining collection chamber 66. Fluid also fills an annular trough 74 bounded by third O-ring 84 and the circumferential wall 36 of bore 20 as represented by the flow arrows in FIG. 1. Accordingly, collection chamber 66 is filled with a volume of oil equal to one (1) drop as the actuator 14 is displaced from the first position to the second position until second O-ring 82 engages second port 32. Displacement of actuator allows fluid contained in the collection chamber 66 to be emitted from third port 34 whereby the fluid is deposited into working passageway 18 upon disengagement of third O-ring 84 from third port 34. When air flows through working passageway 18, the oil spring 96 returns actuator 14 to the first position upon release of the handle 22.

The detailed description of the invention set forth above is merely exemplary in nature and, thus, the present invention may include variations that do not depart from the spirit and scope of the invention as defined in the appended claims.

What is claimed is:

1. An in-line lubricator comprising:
   a body having a working passageway formed therethrough, a fluid reservoir formed therein and a first bore formed therein to provide fluid communication between said working passageway and said fluid reservoir, said first bore having a first end terminating at said fluid reservoir to define a first port and a second end terminating at said working passageway to define a second port;
   an actuator having a transfer cavity formed in an outer surface thereof between a first seal and a second seal, said actuator extending through said first bore and supported in said body for relative movement between a first position wherein said transfer cavity is positioned within said first port and at least partially disposed within said fluid reservoir, said second seal seals said second port to prevent fluid communication between said transfer cavity and said working passageway and a second position wherein said transfer cavity is positioned within said second port and at least partially disposed within said working passageway, said first seal seals said first port to prevent fluid communication between said transfer cavity and said fluid reservoir;
   a spring biasing said actuator towards said first position; and
   wherein movement of said actuator from said first position to said second position transports a predetermined amount of lubricating fluid in said transfer cavity into said working passageway.

2. The in-line lubricator according to claim 1, wherein said body includes a second bore extending from an outer surface of said body through said fluid reservoir and terminating at said first bore, said actuator being slideably supported in said second bore.

3. The in-line lubricator according to claim 2, wherein said actuator extends outwardly from said second bore and includes a handle coupled on a first end thereof for coordinated movement with said actuator.

4. The inline lubricator according to claim 3, wherein said handle engages said outer surface to limit the movement of said actuator.

5. The in-line lubricator according to claim 2, wherein said actuator extends through said first bore and includes a second end having a greater diameter then said first bore for retaining said actuator therein.

6. The in-line lubricator according to claim 5, wherein said spring biases said second end against said port in said first position.

7. The in-line lubricator according to claim 2, wherein said body has a third bore formed therein extending from a second outer surface of said body to said working passageway and a plug disposed in said second bore.

8. The in-line lubricator according to claim 7, wherein said actuator is axially aligned with said plug and said spring is operably disposed between said actuator and said plug for biasing said actuator toward said first position.

9. The in-line lubricator of claim 1 wherein said actuator further comprises a manually-operable actuator having a first portion extending from said body and is supported in said body for relative movement in response to manual manipulation of said first portion from said first position to said second position.

10. A pneumatic tool system comprising:
    a source of compressed air;
    a pneumatic tool selectively powered by said source of compressed air;
    a pneumatic line providing fluid communication between said source of compressed air and said pneumatic tool; and a lubricator including:
  a body having a working passageway formed therethrough, a fluid reservoir formed therein and a first bore formed therein to provide fluid communication between said working passageway and said fluid reservoir, said first bore having a first end terminating at said fluid reservoir to define a first port and a second end terminating at said working passageway to define a second port in fluid communication with said working passageway;
  an actuator having a transfer cavity formed in an outer surface thereof between a first seal and a second seal, said actuator extending through said bore and supported in said body for relative movement between a first position wherein said transfer cavity is positioned within said first port and at least partially disposed within said fluid reservoir, said second seal seals said second port to prevent fluid communication between said transfer cavity and said working passageway and a second position wherein said transfer cavity is positioned within said second port and at least partially disposed within said working passageway, said first seal seals said first port to prevent fluid communication between said transfer cavity and said fluid reservoir;
  a spring biasing said actuator towards said first position; and
  wherein movement of said actuator from said first position to said second position transports a predetermined amount of lubricating fluid in said transfer cavity into said working passageway.

11. The pneumatic tool system according to claim 10, wherein said body of said lubricator includes a second bore extending from an outer surface of said body through said fluid reservoir and terminating at said first bore, said actuator being slideably supported in said second bore.

12. The pneumatic tool system according to claim 11, wherein said actuator of said lubricator extends outwardly from said second bore and includes a handle coupled on a first end thereof for coordinated movement with said actuator.

13. The pneumatic tool system according to claim 12, wherein said handle engages said outer surface to limit the movement of said actuator.

14. The pneumatic tool system according to claim 12, wherein said actuator includes a second end having a greater diameter then said second bore for retaining said actuator in said second bore.

15. The pneumatic tool system according to claim 14, wherein said spring biases said second end against said port in said first position.

16. The pneumatic tool system according to claim 11, wherein said body of said actuator has a third bore formed therein extending from a second outer surface of said body to said working passageway and a plug disposed in said second bore and axially aligned with said first bore, said spring being operably disposed between said actuator and said plug for biasing said actuator toward said first position.

17. The pneumatic tool system of claim 10 wherein said actuator further comprises a manually-operable actuator having a first portion extending from said body and is supported in said body for relative movement in response to manual manipulation of said first portion from said first position to said second position.

18. An in-line lubricator comprising:
  a body having a working passageway formed therethrough, a fluid reservoir formed therein, an interior wall between said working passageway and said fluid reservoir, a first bore extending from an outer surface of said body through said fluid reservoir and terminating at a port formed in said interior wall such that said port provides fluid communication between said working passageway and said fluid reservoir, a second bore extending from a second outer surface of said body and terminating at said working passageway and a plug disposed in said second bore and axially aligned with said first bore;
  an actuator slideably supported in said first bore for relative movement between a first position and a second position, said actuator including an elongated body having a pair of ribs extending radially from said elongated body to define a transfer cavity therebetween, a handle disposed on a first end of said elongated body and a spring seat disposed on a second end of said elongated body, a first seal disposed around said elongated body below said transfer cavity which engage said body to seal said transfer cavity from said working passageway when said actuator is in said first position and a second seal disposed around said elongated body above said transfer cavity which engages said body to seal said transfer cavity from said fluid reservoir when said actuator is in said second position;
  a third seal interdisposed between said actuator and said body to seal said elongated body in said first bore;
  a spring interdisposed between said plug of said body and said spring seat of said actuator for biasing said actuator towards said first position; and
  said transfer cavity in fluid communication with said fluid reservoir in said first position and being in fluid communication with said working passageway in said second position such that a predetermined amount of lubricating fluid is transported from said fluid reservoir into said working passageway.

19. An in-line lubricator comprising:
  a body having a working passageway formed therethrough, a fluid reservoir formed therein and a port providing fluid communication between said working passageway and said fluid reservoir;
  an actuator having a transfer cavity, an o-ring disposed around said actuator below said transfer cavity and a second seal, said actuator supported in said body for relative movement between a first position wherein transfer cavity is in fluid communication with said fluid reservoir and said o-ring seals said port to prevent fluid communication between said transfer cavity and said working passageway and a second position wherein said transfer cavity is in fluid communication with said working passageway and said second seal seals said port to prevent fluid communication between said transfer cavity and said fluid reservoir, whereby said transfer cavity is adapted to transport a predetermined amount of lubricating fluid from said fluid reservoir to said working passageway; and
  a spring biasing said actuator towards said first position.

20. The in-line lubricator according to claim 19, wherein said second seal is an o-ring disposed around said actuator above said transfer cavity which engages said body to seal said transfer cavity from said fluid reservoir when said actuator is in said second position.

21. A pneumatic tool system comprising:
  a source of compressed air;
  a pneumatic tool selectively powered by said source of compressed air;

a pneumatic line providing fluid communication between said source of compressed air and said pneumatic tool; and a lubricator including:

a body having a working passageway formed through said body and defining an inlet in fluid communication with said source of compressed air and an outlet in fluid communication with said pneumatic tool, a fluid reservoir containing a lubricating fluid and a port providing fluid communication between said working passageway and said fluid reservoir;

an actuator supported from movement in said body between a first position and a second position, said actuator having a transfer cavity formed therein, a first seal including an o-ring around said actuator below said transfer cavity which engages said body to seal said transfer cavity from said working passageway when said actuator is in said first position and a second seal sealing said port to prevent fluid communication between said transfer cavity and said fluid reservoir when said actuator is in said second position, said transfer cavity being filled with a predetermined amount of said lubricating fluid from said fluid reservoir when said actuator is in said first position and dispensing said predetermined amount of said lubricating fluid into said working passageway when actuator is in said second position; and a spring biasing said actuator toward said first position;

whereby said predetermined amount of said lubricating fluid is transported from said working passageway into said pneumatic tool.

22. The pneumatic tool system according to claim 21, wherein said second seal of said actuator is an o-ring disposed around said actuator above said transfer cavity which engages said body to seal said transfer cavity from said fluid reservoir when said actuator is in said second position.

* * * * *